(12) United States Patent
Hoffmüller et al.

(10) Patent No.: US 8,557,369 B2
(45) Date of Patent: Oct. 15, 2013

(54) EMBOSSING LACQUER FOR MICRO-OPTICAL SECURITY ELEMENTS

(75) Inventors: Winfried Hoffmüller, Bad Tölz (DE); Marius Dichtl, München (DE)

(73) Assignee: Geisecke & Devrient GmbH, Munich (DE)

( * ) Notice: Subject to any disclaimer, the term of this patent is extended or adjusted under 35 U.S.C. 154(b) by 1098 days.

(21) Appl. No.: 12/527,043

(22) PCT Filed: Feb. 13, 2008

(86) PCT No.: PCT/EP2008/001097
§ 371 (c)(1),
(2), (4) Date: Aug. 13, 2009

(87) PCT Pub. No.: WO2008/098753
PCT Pub. Date: Aug. 21, 2008

(65) Prior Publication Data
US 2010/0109317 A1 May 6, 2010

(30) Foreign Application Priority Data

Feb. 14, 2007 (DE) .......................... 10 2007 007 914

(51) Int. Cl.
*B44F 1/00* (2006.01)
*G11B 5/00* (2006.01)
*B44C 1/00* (2006.01)
*B42D 15/00* (2006.01)
*B05D 7/00* (2006.01)

(52) U.S. Cl.
USPC ............ 428/195.1; 428/29; 428/141; 283/72; 427/402

(58) Field of Classification Search
USPC ............. 428/29, 141, 195.1; 427/402; 283/72
See application file for complete search history.

(56) References Cited

U.S. PATENT DOCUMENTS

| 4,892,336 A | 1/1990 | Kaule et al. |
| 6,709,107 B2 | 3/2004 | Jiang et al. |

(Continued)

FOREIGN PATENT DOCUMENTS

| DE | 3609090 A1 | 9/1987 |
| DE | 102005028162 A1 | 12/2006 |

(Continued)

OTHER PUBLICATIONS

Hutley, M.C. et al., "The moiré magnifier", Pure Appl. Opt. 3, 1994, pp. 133-142, IOP Publishing, printed in the UK.

(Continued)

*Primary Examiner* — Mark Ruthkosky
*Assistant Examiner* — Laura C Dettinger
(74) *Attorney, Agent, or Firm* — Workman Nydegger

(57) ABSTRACT

A highly refractive embossing lacquer for producing micro-optic arrangements which contains at least one binding agent which has at least one radiation-curing compound system having one or more organic compounds. The highly refractive embossing lacquer has at least a portion of the organic compounds of the radiation-curing compound system having molecules with at least one polarizable element, so that a polymeric material with a refractive index of greater than 1.5 is formed upon radiation curing. A security element which is produced with at least one micro-optic authenticity feature is also provided. The micro-optic authenticity features permit the production of security elements that are so thin that they can be easily incorporated into value documents.

37 Claims, 4 Drawing Sheets

(56) References Cited

U.S. PATENT DOCUMENTS

| | | | |
|---|---|---|---|
| 7,198,824 B1 * | 4/2007 | Schwarte et al. | 427/407.1 |
| 2005/0124714 A1 * | 6/2005 | Weikard et al. | 522/35 |
| 2005/0250870 A1 * | 11/2005 | Jallouli | 522/182 |
| 2006/0199095 A1 * | 9/2006 | Olson et al. | 430/111.35 |
| 2008/0160226 A1 * | 7/2008 | Kaule et al. | 428/29 |
| 2009/0008923 A1 | 1/2009 | Kaule et al. | |
| 2009/0297805 A1 | 12/2009 | Dichtl | |

FOREIGN PATENT DOCUMENTS

| | | |
|---|---|---|
| DE | 10200562132 A1 | 7/2007 |
| DE | 102006029852 A1 | 1/2008 |
| EP | 0238043 A2 | 9/1987 |
| EP | 0330733 A1 | 9/1989 |
| WO | 8201595 | 5/1982 |
| WO | 9913157 A1 | 3/1999 |
| WO | WO0132729 A1 * | 5/2001 |
| WO | 2006087138 A1 | 8/2006 |
| WO | WO 2006087138 A1 * | 8/2006 |

OTHER PUBLICATIONS

Lü, Changli et al., "High refractive index thin films of ZnS/polythiourethane nanocomposites", J. Mater. Chem., 2003, 13, pp. 526-530.

International Search Report in PCT/EP2008/001097, Aug. 1, 2008.

* cited by examiner

EMBOSSING LACQUER FOR MICRO-OPTICAL SECURITY ELEMENTS

FIELD OF THE INVENTION

This invention relates to an embossing lacquer which is suitable for producing micro-optic arrangements, in particular for micro-optic security elements, a method for producing such micro-optic arrangements and security elements, a micro-optic security element, the use of the micro-optic security element for product protection, a data carrier, such as a value document, having the micro-optic security element, and the production of a value document having the micro-optic security element.

BACKGROUND

Data carriers, such as value documents or identification documents, bank notes, deeds, checks, but also other objects of value, such as branded articles, are often provided for protection with security elements which permit a check of the authenticity of the data carrier and which at the same time serve as protection from unauthorized reproduction. The security elements can be configured for example in the form of a security thread embedded in a bank note, a cover foil for a bank note with a hole, an applied security strip or a self-supporting transfer element, such as a label, which is applied after its production to the value document. Another variant is for example a tear thread for product packages.

A special role is played here by security elements having optically variable elements which convey different pictorial impressions to the viewer from different viewing angles, because optically variable elements cannot be reproduced even with high-quality color copiers. The security elements can be equipped for this purpose with security features in the form of optically-diffractively active micro- or nanostructures, e.g. with conventional embossed holograms or other hologram-like diffraction structures, as described for example in the prints EP 0 330 733 A1 or EP 0 064 067 A1.

It is also known to use lens systems as security features. There is thus described for example in the print EP 0 238 043 A2 or in DE 36 09 090 A1 a security thread made of a transparent material having embossed on its surface a screen comprising a plurality of parallel cylindrical lenses. The thickness of the security thread is so chosen that it corresponds approximately to the focal length of the cylindrical lenses. A printed image is applied in exact register to the opposite surface, the printed image being designed with consideration of the optical properties of the cylindrical lenses.

For some time so-called moire magnification arrangements have also been used as authenticity features. Such a moire magnification arrangement is disclosed in the print WO 2006/087138 A1 or in DE 10 2005 028 162 A1. The security element disclosed in WO 2006/087138 A1 has at least first and second authenticity features. The first authenticity feature comprises a first arrangement with a multiplicity of focusing elements which are present in a first grid, and a second arrangement with a multiplicity of microscopic structures which are present in a second grid. The first and second arrangements are disposed relative to each other such that the microscopic structures of the second arrangement are to be seen magnified upon viewing through the focusing elements of the first arrangement.

Such a magnification effect is also referred to as moire magnification. The basic mode of functioning of moire magnification arrangements is described in the article "The moiré magnifier", M. C. Hutley, R. Hunt, R. F. Stevens and P. Savander, Pure Appl. Opt. 3 (1994), pp. 133 to 142. Very briefly, moire magnification thus designates a phenomenon which occurs upon viewing a grid comprising identical image objects through a lenticular screen with approximately the same pitch. As with any pair of similar grids this results in a moire pattern, but in this case each moire fringe appears in the form of a magnified and rotated image of the repeat elements of the image grid.

The focusing elements of micro-optic authenticity features are embossed from embossing lacquers. The microstructures to be viewed through the focusing elements can have any desired forms. According to WO 2006/087138 A1 they are produced from a colorless embossing lacquer and coated reflectively or produced from a colored embossing lacquer. So that a complete microstructure is recognizable in each case through the focusing elements, referred to hereinafter as microlenses, microlenses and microstructures must be of approximately the same order of magnitude. Moreover, the magnification effect of the microlenses is the greater the closer the microstructure is located to the focus of the lens. Since the focal length is smaller the stronger the curvature of the lens is, it is necessary for good magnification that either the distance between lens and microstructure is large (with a small lens curvature) or a strongly curved lens is employed (with a smaller distance between lens and microstructure).

The relation between the size of the microstructure, the diameter and the focal length of the lenses causes a strong curvature of the lenses and a relatively high thickness of the micro-optic authenticity feature and thus of the security element.

On account of the necessary considerable embossing depth and curvature, the focusing elements or microlenses are difficult to produce by embossing. Moreover, in the case of strongly curved microlenses the size of the microstructures to be reproduced is limited.

Another problem consists in the fact that incorporation into value documents, e.g. bank notes, is more difficult the thicker the security element is. Upon bending or creasing of the value document, thick security elements act brittle and tend to break.

In addition, embossed layers of high thickness tend to scatter light uncontrolledly, so that through thick microlenses the microstructure motif to be viewed can be outshone and its brilliance reduced.

A further difficulty is the resolution of the motifs of the microstructure arrangement. The microstructures must be in the order of magnitude of the microlenses. If complex microstructures, such as letters, numbers, logos or even images, are to be represented, the resolution must be a few micrometers, preferably considerably therebelow, i.e. in the nanometer range. Such resolutions can often not be obtained with classical printing methods as are sometimes employed for producing the microstructure motifs in conventional micro-optic authenticity features. An alternative to printing is the production of the microstructure motifs by embossing of embossing lacquers as carried out according to WO 2006/087138 A1. However, this alternative is often satisfactory only in the case of colorless embossing lacquers. Colored embossing lacquers can be colored either by pigments or by soluble dyes. Both possibilities have disadvantages. Soluble dyes tend to bleed in connection with solvents and sometimes show considerable migration. Pigments often contain particles with a particle size that is too large for completely following the embossed structure of extremely fine microstructures. This results in microstructure motifs with pigment defects that are clearly visible when magnified.

SUMMARY

Starting out from this prior art, the invention is based on the object of providing a security element having micro-optic authenticity features which has a reduced thickness compared to prior art security elements, as known for example from EP 0 238 043 A2 and from WO 2006/087138 A1, and can be easily incorporated into value documents, such as bank notes.

A further object is to provide a security element having micro-optic authenticity features which has colorless, colored or color-variable microstructures.

An object of the present invention is further to provide a security element having micro-optic authenticity features which has colorless, colored or color-variable microstructures of high resolution, preferably a resolution in the nanometer range.

Furthermore, it is an object of the invention to provide a security element having micro-optic authenticity features which has elevated forgery resistance.

It is also an object of the invention to provide a method for producing such security elements.

It is further an object of the invention to provide an embossing lacquer which permits the production of such security elements.

Further objects of the invention consist in the provision of a value document having such a security element with micro-optic authenticity features and in the use of the security element with micro-optic authenticity features for product protection.

The present invention relates inter alia to security elements having micro-optic authenticity features with a structure as fundamentally known from WO 2006/087138 A1. With regard to the different embodiments of the security element, in particular with regard to the grid arrangement of the focusing elements (microlenses) and the microscopic structures (motif elements), with regard to the geometrical shape of the microlenses and the microscopic structures, with regard to the structure of the security element, i.e. the employed layers and layer sequences, and with regard to the achieved effects (e.g. color and kinetic effects), reference is expressly made to WO 2006/087138 A1, whose disclosure is incorporated in this regard into the disclosure of the present application. The security element according to the print incorporated by reference has a first micro-optic authenticity feature and a second authenticity feature which is checkable by machine and/or visually. The subject matter of the present invention also includes security elements without such a second authenticity feature, i.e. security elements having only one micro-optic authenticity feature or a plurality of micro-optic authenticity features, optionally in combination with a further authenticity feature different from the second authenticity feature according to the print incorporated by reference.

The production of the inventive security element, in particular of the microlenses and the microscopic structures, can likewise be effected by means of the techniques disclosed in WO 2006/087138 A1. Alternatively, the microlenses and the microscopic structures can also be produced by the method disclosed in the German patent application with the application number 10 2006 029 852.7. The disclosure of this application is incorporated in this regard into the disclosure of the present application. Also, the relevant method will be explained more closely below.

For a detailed representation of the mode of functioning and advantageous arrangements of the micromotif elements and the microlenses, reference is also made to the pending German patent application with the application number 10 2005 062 132.5, whose disclosure is in this respect likewise incorporated into the disclosure of the present application.

The focusing elements or microlenses of conventional micro-optic authenticity features, such as the authenticity features disclosed in WO 2006/087138 A1, are embossed from conventional embossing lacquers. Conventional embossing lacquers have a refractive index of about 1.5.

The inventive security element having a micro-optic authenticity feature, referred to hereinafter as the "micro-optic security element", differs from conventional micro-optic security elements insofar as a special embossing lacquer is employed for producing the focusing elements and/or the microscopic structures.

The embossing lacquer, in particular the embossing lacquer employed for producing the focusing elements, has a high refractive index. The high refractive index is achieved by the inventive embossing lacquer containing a binding agent having organic compounds of high refractive index which undergo a polyreaction when used with a polymerization initiator under the influence of radiation, in particular UV radiation, or of electron beams, and crosslink or cure into a polymer of high refractive index. A high refractive index for the purposes of the present invention is a refractive index of more than 1.5, preferably more than 1.6, particularly preferably more than 1.7. The refractive index is in each case the refractive index at 589 nm and 20° C., unless otherwise stated.

Compounds of high refractive index are known. For some time, spectacle lenses and contact lenses made of plastic in a highly refractive variant have also been offered. The elevated refractive index makes it possible to produce thinner contact lenses and spectacles with similar optical properties to those of thicker contact lenses and spectacles made of plastic of lower refractive index and, hence, results in contact lenses that are more pleasant to wear or lighter spectacles.

U.S. Pat. No. 6,709,107 discloses ophthalmic lenses consisting of two layers, the two layers being produced from polymeric materials with a different refractive index. The first polymeric material has a refractive index of at least 1.6 and is for example a polythiourethane or an episulfide polymer. The second polymeric material has a lower refractive index and is for example a poly(allylcarbonate), a polyurethane, a polythiourethane and/or a polycarbonate.

Polythiourethanes have long been employed for producing optical lenses/glasses of high refractive index (see Internet site "http://www.brunobock.org").

According to the invention, compounds of high refractive index are now employed for producing micro-optic authenticity features, i.e. arrangements of focusing elements and arrangements of microstructures.

It is fundamentally possible to use for this purpose all organic compounds and combinations of organic compounds that can be processed into a lacquer system that is embossable or can be put into a desired form in another manner (embossing lacquer), and upon irradiation, in particular UV or electron irradiation, undergo a polyreaction and crosslink or cure into a polymeric material, i.e. a polymer, a copolymer or a mixture of polymers and/or copolymers, of high refractive index.

The polymer, the copolymer, and the mixture of polymers and/or copolymers of high refractive index will hereinafter be designated "highly refractive polymeric material". The embossing lacquer forming the highly refractive polymer upon irradiation will hereinafter be designated "highly refractive embossing lacquer".

The organic compounds forming the highly refractive polymer have a high refractive index themselves. Such compounds contain polarizable elements in their molecules. The polarizability of an element (i.e. an atom) is a measure of the deformability of the electron cloud around the atom. It is greater e.g. in iodine than in bromine or chlorine. Polarizable elements for the purposes of the present invention are elements having a greater polarizability than carbon, in particular halogens, such as iodine, bromine, chlorine and sulfur. The polarizable elements give the compounds or their molecules an elevated polarizability and thus an elevated refractive index.

The relevant radiation-curing compounds contain at least one polarizable element in their molecules, i.e. in a monomer. They can also contain a plurality of polarizable elements per monomer, for example, at least two polarizable elements, whereby the polarizable elements can be like or different. It holds in general that the refractive index is higher the more polarizable elements a monomer contains and the more strongly polarizable elements a monomer contains.

The radiation-curing compounds undergoing a polyreaction with each other constitute a radiation-curing compound system.

A radiation-curing compound system either has molecules of the same type of chemical compound, e.g. olefinically unsaturated compounds, which polymerize by means of their unsaturated bonds (self-crosslinker), or it has molecules of different types of chemical compound, i.e. a first compound which can be reacted so as to crosslink with a second compound (a bi- or polyfunctional crosslinking agent).

The molecules of a radiation-curing compound system can moreover possess the same chemical identity or different chemical identities. For example, they can be identical acrylate molecules or differently substituted acrylate molecules. In the former case homopolymers arise, in the latter case copolymers. Copolymers also arise with mixtures of two or more radiation-curing compound systems. The higher the functionality of the monomers is, the stronger the crosslinking of the resulting polymeric material is. Molecules of different functionality can be employed in each radiation-curing compound system, but in self-crosslinking compound systems the average functionality must be greater than 1, and in compound systems crosslinking by means of curing agent the average functionality must be greater than 2.

The highly refractive embossing lacquer can contain one or more radiation-curing compound system(s).

The type of polyreaction which a radiation-curing compound system under-goes to form the polymeric material of high refractive index is basically irrelevant. Compound systems undergoing polymerization, and compound systems undergoing polyaddition, and compound systems undergoing polycondensation can all be used.

The compounds of a radiation-curing compound system can be used as monomers or as prepolymers or as mixtures thereof.

The highly refractive compounds, i.e. the compounds of high refractive index, can also be employed jointly with radiation-curing compounds of lower refractive index, provided that the polymeric material formed upon the polyreaction is a highly refractive polymeric material.

The radiation-curing compound system or the radiation-curing compound systems constitute the binding agent of the highly refractive embossing lacquer. The highly refractive embossing lacquer contains either only radiation-curing organic compounds or typically further components. These may be additives usual in embossing lacquers, such as additives for viscosity control, additives for flow control or release, waxes, defoamers, thinners, optionally reactive thinners. Further additives are optionally photoinitiators or coloring and/or refractive index enhancing additives. Photoinitiators are typically necessary in UV curing, but not in electron beam curing.

The curing of the embossing lacquer can be initiated both cationically and radically, in UV curing also in dependence on the chosen photoinitiator, depending on the choice of monomers or prepolymers. The photoinitiator should preferably be active both in the short-wave UV spectrum and in the long-wave UV spectrum. Activity in the short-wave spectral range is often important for a good surface cure, and activity in the long-wave spectral range is important for a good full cure. Hence, it is often advisable to employ a photoinitiator system comprising at least two photoinitiators with activity in different spectral ranges.

Preferred radiation-curing compound systems are for example acrylates which can polymerize via their unsaturated compounds, or epoxides which can polymerize via their epoxide groups, or episulfides which can polymerize via their episulfide groups. Acrylates, epoxides and episulfides, each with a functionality of greater than 1, are self-crosslinking radiation-curing compound systems.

Preferred acrylates are for example phenylthioethyl acrylate (PTEA) with a refractive index of 1.557, available from BIMAX, Structural Formula PTEA

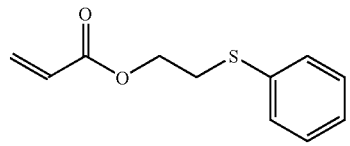

bis(4-methacryloylthiophenyl)sulfide (MPSMA), available from Sumitomo Seika Co. (Japan), Structural Formula MPSMA

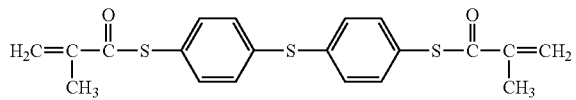

bis(4-vinylthiophenyl)sulfide (MPV) with a refractive index of 1.695, available from Sumitomo Seika Co. (Japan).

Structural Formula MPV

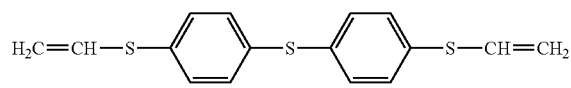

Further preferred acrylates are pentabromophenyl methacrylate or 2,6-dichlorostyrene.

A preferred epoxide is bis[4-(2,3-epoxypropylthio)phenyl]sulfide (MPG) with a refractive index of 1.669.

Structural Formula MPG

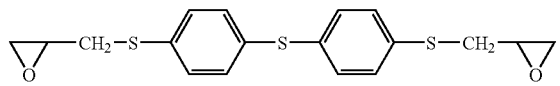

Preferred episulfides are disulfides as disclosed in U.S. Pat. No. 6,709,107.

Preferred radiation-curing compound systems containing a curing agent for crosslinking contain as further compounds for example isocyanates, olefinically unsaturated compounds, epoxides or episulfides. Preferred olefinically unsaturated compounds are for example simple alkenes, allyl ethers, vinyl acetate, alkyl vinyl ethers, conjugated dienes, styrene and acrylates. Isocyanates, olefinically unsaturated compounds, epoxides and episulfides are advantageously crosslinked with thiols and/or polythiols as a curing agent. The starting compounds have an average functionality of greater than 2.

Polythiols lead to especially fast-curing systems both with epoxides and episulfides and with isocyanates and with unsaturated monomers/oligomers. The crosslinking reactions can be initiated with UV light and with electron beam. The degree of crosslinking and thus the hardness of the resulting polymeric material is adjustable via the functionality of the components. The molecular weight is adjusted in particular by the polythiols or thiols. Polythiols and thiols are known as chain-length regulators for adjusting the molecular weight of different polymers.

The polyreactions of thiols and polythiols with isocyanates, olefinically unsaturated compounds, epoxides and episulfides take place as polyadditions. The reactions of thiols and polythiols with olefinically unsaturated compounds are referred to as thiol-ene reactions. The initiators to be used may be standard photoinitiators which produce free radicals or polymerization initiators, or it is possible to employ dehydrogenating initiators. It is even possible to excite and split the thiol groups directly by radiation, giving rise to thiyl and hydrogen radicals which initiate the radical chain process.

The curing of isocyanates with thiols is preferably effected by radical initiators or by bases activatable by UV irradiation, such as α-aminoacetophenone, or amines activatable by UV irradiation.

Preferred thiols are pentaerythritol-tetrakis-3-mercaptopropionate (PETMP), 2-ethyl-2-(hydroxymethyl)-1,3-propanediol trithioglycolate, trimethylolpropane trimercaptoacetate (TMPMA), glycol dimercaptoacetate (GDMA) and ethoxylated trimethylolpropane-tri(3-mercaptopropionate) (ETTMP).

The refractive index of the highly refractive polymeric material can be further enhanced according to the invention by adding inorganic particles of high refractive index to the highly refractive embossing lacquer.

Suitable inorganic materials for enhancing the refractive index are metal oxides, metal suboxides, metal fluorides, metal oxyhalides, metal sulfides, metal chalcogenides, metal nitrides, metal oxynitrides, metal carbides and mixtures thereof, in particular silicon oxide ($SiO_2$), zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides, such as $Fe_3O_4$ and $Fe_2O_3$, hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), aluminum oxide ($Al_2O_3$), zinc sulfide (ZnS) and mixtures thereof. Particularly preferable are $TiO_2$, $ZrO_2$, $Fe_2O_3$, $Fe_3O_4$, $Cr_2O_3$, ZnO, $Al_2O_3$ and ZnS. It is particularly preferable to employ mixtures of different, refractive index enhancing particles.

According to the invention, said highly refractive organic materials are employed in the form of so-called "nanoparticles". Nanoparticles are available for example from Byk (Nanobyk) and from Clariant. The smaller the nanoparticles are, the finer the structures are that can be formed with the embossing lacquer, and the more preferred the nanoparticles are. Nanoparticles in the order of magnitude of 5 nm are most preferable, but nanoparticles in the offered orders of magnitude of 10 nm, 20 nm and even 50 nm are still very suitable.

When such nanoparticles are added to conventional plastics with a refractive index of about 1.5, this leads to strong light scattering because of the high difference in the refractive indices between the nanoparticles and the plastic material. In the inventive highly refractive embossing lacquers, however, the difference in the refractive indices between the polymeric material and the nanoparticles is small, which leads to good optical clarity of the polymeric materials containing nanoparticles.

Nanoparticles can also be employed for coloring the inventive highly refractive embossing lacquer. With such nanopigments it is possible very advantageously to produce colored microstructures with very fine resolution. Highly refractive embossing lacquers containing nanopigments can of course also be employed for producing the focusing elements in order to obtain colored focusing elements, in particular when the nanopigments have a high refractive index. Suitable nanopigments are for example conductive carbon blacks which are available in a primary particle size of 18 nm to 23 nm ("Printex" and "Hiblack" from Degussa).

The nanoparticles, e.g., nanopigments, should be distributed as homogeneously as possible in the highly refractive embossing lacquer. An especially homogeneous distribution can be achieved when the nanoparticles are functionalized with reactive groups and form nanocomposites with the polymeric materials via said reactive groups. Such a nanocomposite is described by Changli Lü, Zhanchen Cui, Zuo Li, Bai Yang and Jiacong Shen, Journal of Materials Chemistry, 2003, 13(3), 526 to 530. The material described here is a nano-ZnS/polyurethane composite material which was produced by immobilization of ZnS nanoparticles functionalized with thiophenol and mercaptoethanol, in a polyurethane matrix. Films made of said material have a refractive index of up to 1.848 (at 632.8 nm).

A further especially preferred way of coloring inventive highly refractive embossing lacquers is to polymerize a suitable dye into the highly refractive embossing lacquer. Dichroic dyes which can polymerize in upon crosslinking without negatively changing their color are available from Rolic. Such dyes can also be synthesized starting out from so-called reactive dyes for fiber dyeing. Said reactive dyes contain, besides the chromophore component, a special reactive component via which they are bound covalently to the fibers by reaction with functional groups of the fibers. Upon the coloring of the inventive highly refractive embossing lacquers the reactive groups of the reactive dyes do not react with functional groups of the fibers, but for example with OH groups or SH groups of the radiation-curing compounds or reactive thinners of the inventive highly refractive embossing lacquers. Because the dyes are polymerized, and thus fixed, in the highly refractive polymeric material formed, they do not show the disadvantages of migration and lack of resistance to solvents of the dyes as are conventionally employed for coloring embossing lacquers. Reactive dyes of high refractive index are especially advantageous. Coloring with reactive dyes can be effected alternatively or additionally to coloring with nanopigments.

The radiation-curing compounds and optionally pigments, dyes as well as the wavelength of the radiation source, in the case of UV curing also the photoinitiator system, must be coordinated with each other to obtain a good cure. The company BASF presented at RadTech 2005 in Barcelona a computer program which enables predictions about the possibility of curing a UV lacquer under certain conditions for some combinations.

Hereinafter some exemplary formulations will be given for highly refractive UV-curing embossing lacquers:

|  | Wt. % |
|---|---|
| Radically curing | |
| Pentabromophenyl methacrylate (n = 1.71) | 45 |
| Phenylthioethyl acrylate (n = 1.56) | 45 |
| S,S'-thiodi-4,1-phenylene-bis(thiomethacrylate) (Sigma-Aldrich) | 5 |
| Irgacure 907 (Ciba) | 5 |
| Pentabromophenyl methacrylate (n = 1.71) | 45 |
| Phenylthioethyl acrylate (n = 1.56) | 45 |
| PETIA: Pentaerythritol triacrylate, pentaerythritol tetraacrylate (Mixture, Cytec) | 5 |
| Irgacure 907 (Ciba) | 5 |
| Pentabromophenyl methacrylate (n = 1.71) | 40 |
| 2,6-dichlorostyrene (n = 1.57) (Sigma-Aldrich) | 30 |
| Phenylthioethyl acrylate (n = 1.56) (BIMAX) | 20 |
| S,S'-thiodi-4,1-phenylene-bis(thiomethacrylate) (Sigma-Aldrich) | 5 |
| Irgacure 1700 (Ciba) | 5 |
| Pentabromophenyl methacrylate (n = .71) | 40 |
| 2,6-dichlorostyrene (n = 1.57) (Sigma-Aldrich) | 30 |
| Phenylthioethyl acrylate (n = 1.56) (BIMAX) | 20 |
| PETIA: Pentaerythritol triacrylate, pentaerythritol tetraacrylate (Mixture, Cytec) | 5 |
| Irgacure 1700 (Ciba) | 5 |
| S,S'-thiodi-4,1-phenylene-bis(thiomethacrylate) (Sigma-Aldrich) | 50 |
| Phenylthioethyl acrylate (BIMAX) | 45 |
| Irgacure 1700 (Ciba) | 5 |
| S,S'-thiodi-4,1-phenylene-bis(thiomethacrylate) (Sigma-Aldrich) | 35 |
| Phenylthioethyl acrylate (BIMAX) | 40 |
| ZnS nanoparticles (optionally functionalized) | 20 |
| Irgacure 1700 (Ciba) | 5 |
| Cationically curing | |
| Bis[4-(2,3-epoxypropylthio)phenyl]sulfide (www.sumitomoseika.co.jp) | 80 |
| DVE-3 (Rahn or Cytec) | 16 |
| Cyracure UVI-6992 (photoinitiator from DOW) | 4 |

The inventive highly refractive embossing lacquers are advantageously employable both for producing the arrangement of focusing elements and for producing the arrangement of microstructures of an authenticity feature. For the focusing elements what is essential is in particular the high refractive index, while for the microstructures what is essential is primarily the attainable fine resolution through the nanopigments, preferably polymerized-in nanopigments, and the polymerized-in dyes.

Inventive micro-optic security elements are equipped with focusing elements consisting of the inventive embossing lacquer and/or with microstructures consisting of the inventive embossing lacquer.

With the inventive embossing lacquers there can be produced security elements with a thickness of 20 µm to 50 µm, at a carrier foil thickness in the range of 5 µm to 25 µm. In a preferred embodiment, the grid spacing of the arrangement of focusing elements and of the arrangement of microstructures is between about 3 µm and about 50 µm, preferably between about 5 µm and about 35 µm, particularly preferably between about 10 µm and about 20 µm. The diameter of the focusing elements is typically in the order of magnitude of about 10 µm to 30 µm, and the diameter of the individual microstructure elements is preferably the same size.

For producing the microlenses and the microstructures, different methods are used. In particular, using classical techniques of semiconductor technology (photolithography, electron beam lithography) suitable structures in resist materials can be exposed, possibly refined, electroformed and employed for manufacturing embossing tools for foil embossing. Particularly suitable for producing large surfaces are the known methods for embossing into thermoplastic foils or into foils coated with radiation-curing lacquers. Alternatively, techniques are also known for applying microlens arrangements by ink jet printing methods or by self-organization processes of microparticles on surfaces.

Using classical methods of semiconductor technology it is in particular possible to produce microstructures with any desired shapes and contours.

A further method for producing microstructures for an inventive microstructure arrangement is so-called micro-contact printing (µCP). This permits a resolution of less than 1 µm and is hence suited for producing small, high-resolution, printed microscopic structures. In this method the microscopic structures are produced by techniques of semiconductor patterning (photolithography, electron beam lithography, etching and lift-off methods, nanoimprint lithography, etc.) and subsequently cast with an elastomer (e.g. PDMS). This results in a flexible, finely structured stamp or printing cylinder which is suitable for transferring extremely thin ink layers upon use of special printing inks and surface treatment of the printing substrate. By applying a suitable ink by means of a thus produced printing cylinder it is possible to produce printed microscopic structures of high resolution.

Alternatively, the microstructure and/or the microlenses can be applied to the carrier by a microgravure printing method. In this method a mold tool is employed whose surface has an arrangement of elevations and depressions in the form of the desired microstructure or the desired microlenses, the depressions of the mold tool are filled with a curable, colored or colorless embossing lacquer, the carrier is pretreated for good anchoring of the colored or colorless lacquer, the surface of the mold tool is contacted with the carrier, the lacquer in contact with the carrier is cured in depressions of the mold tool and thereby connected with the carrier, and the surface of the mold tool is removed from the carrier so that the cured embossing lacquer connected with the carrier is pulled out of the depressions of the mold tool.

It should be noted at this point that the micro-optic arrangements produced from an inventive highly refractive embossing lacquer can advantageously be equipped with an overlacquering. Such a layer disposed on the micro-optic arrangements protects the micro-optic arrangements against forgery attacks, because a casting of the micro-optic arrangements is no longer possible. The use of the inventive embossing lacquer for producing the micro-optic arrangements also has an advantageous effect on the production of the overlacquering, because e.g. the inventive thin lenses of small curvature can also be equipped with a further layer (overlacquering) more easily and reliably than hitherto possible according to the prior art.

Hereinafter some exemplary inventive security elements will be explained with reference to figures. The embodiments are to be understood as strictly illustrative and by no means restrictive. For clarity's sake the figures do not show a true-to-scale or true-to-proportion representation. In particular, the lens curvatures and distances between lenses and microstructures shown in the figures do not indicate the actual lens curvatures and distances between lenses and microstructures realizable according to the invention in practice.

DETAILED DESCRIPTION OF VARIOUS EMBODIMENTS OF THE DISCLOSURE

Figure 1:
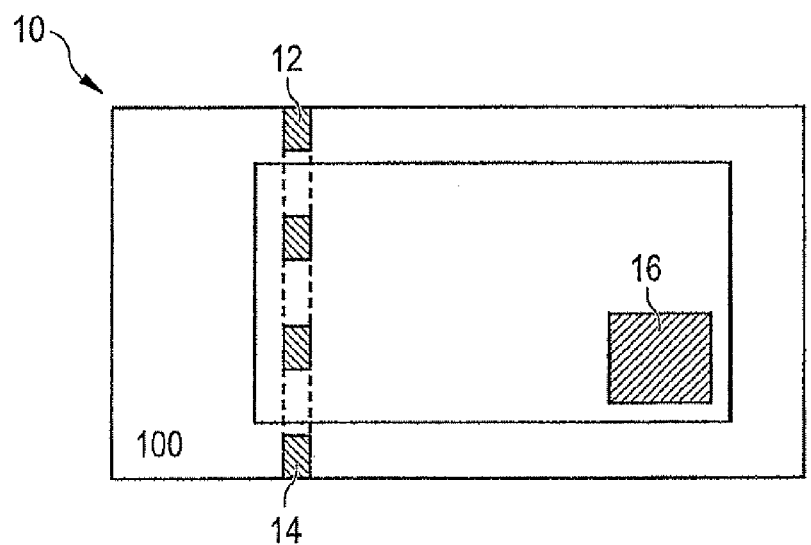
FIG. 1 a schematic representation of a bank note with an embedded security thread and an affixed transfer element, FIG. 2 a schematic view of the layer structure of an inventive security thread in cross section, FIG. 3 an inventive security element with a monochrome motif image, with (a) showing a strongly schematized perspective view from obliquely above, and (b) a cross section through the security element, FIG. 4 an inventive security element with a polychrome motif image, with (a) showing a schematic plan view, and (b) a cross section through the security element, FIG. 5 a representation like FIG. 4 for an inventive security element with a motif image with mixed colors, FIG. 6 in (a) and (b) steps for producing microscopic structures for the microstructure arrangement of an inventive security element, FIG. 7 a cross section through a microstructure arrangement of an inventive security element, and FIG. 8 an inventive security element with microscopic structures producible according to the exemplary embodiment of FIG. 6, in cross section.

The invention will now be explained more closely by the example of a bank note. FIG. 1 shows for this purpose a schematic representation of a bank note 10 with two security elements 12 and 16. The first security element is a security thread 12 which emerges on the surface of the bank note 10 in certain window areas 14 while it is embedded inside of the bank note 10 in the interjacent areas. The second security element is formed by an affixed transfer element 16 of any desired shape.

Figure 2:
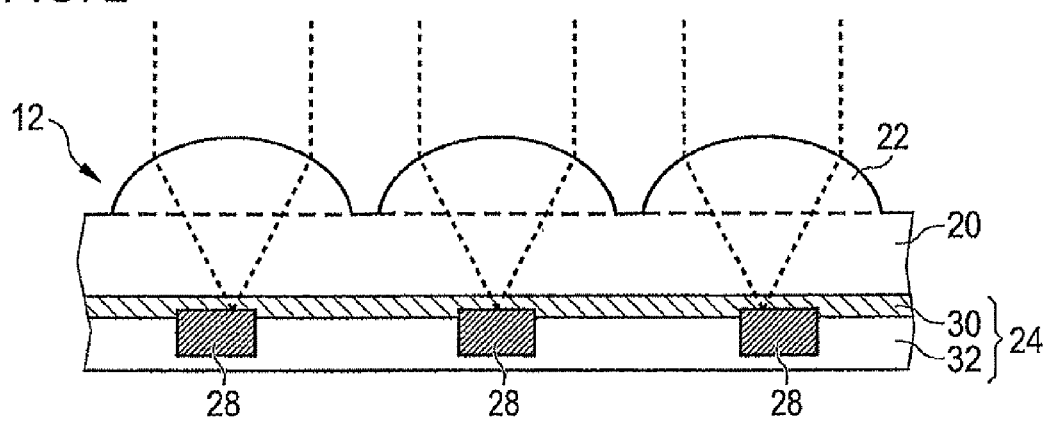

FIG. 2 shows schematically the layer structure of the security thread 12 in cross section. The security thread 12 contains a carrier 20 in the form of a transparent plastic foil, for example a PET foil about 20 μm thick. The upper side of the carrier foil 20 is provided with a grid-like arrangement of microlenses 22 which form on the surface of the carrier foil a grating with a preselected symmetry.

On the underside of the carrier foil 20 there is disposed an arrangement of microstructures, a motif layer 24 which contains a likewise grid-like arrangement of identical micromotif elements 28. The arrangement of the micromotif elements 28 also forms a two-dimensional grating with a preselected symmetry.

As indicated in FIG. 2 by the offset of the micromotif elements 28 relative to the microlenses 22, the grating of the micromotif elements 28 differs slightly in its symmetry and/or in the size of its grating parameters from the grating of the microlenses 22. This produces a moire magnification effect. If the micromotif elements 28 are printed precisely in the grid spacing of the microlenses 22, alternating image effects can be achieved. For example, it is thereby possible to produce a so-called "flash" image wherein the microstructures are visible to an observer only from a certain viewing direction while they are unrecognizable from all other directions. The grating period and the diameter of the micromotif elements 28 are in the same order of magnitude as the grating period and the diameter of the microlenses 22 and cannot be recognized with the naked eye.

FIG. 2 shows a security element wherein the micromotif elements 28 were applied by microgravure printing. On the side of the carrier opposing the microlenses 22 there is hence provided a support layer 30 consisting of transparent, UV-curing lacquer. The support layer 30 can alternatively also be produced from a UV-curing or electron beam-curing embossing lacquer colored with nanopigments or reactive dyes according to the invention. The same holds for the micromotif elements 28. At least the arrangement of the microlenses 22, however, is produced from the inventive highly refractive embossing lacquer, so that the microlenses 22 can have a small curvature and the security thread 12 has a small thickness of about 20 μm. Hence, the security thread 12 can be incorporated into a bank note absolutely without problems. It is therefore provided for example with a heat seal finish 32.

Figure 3A:
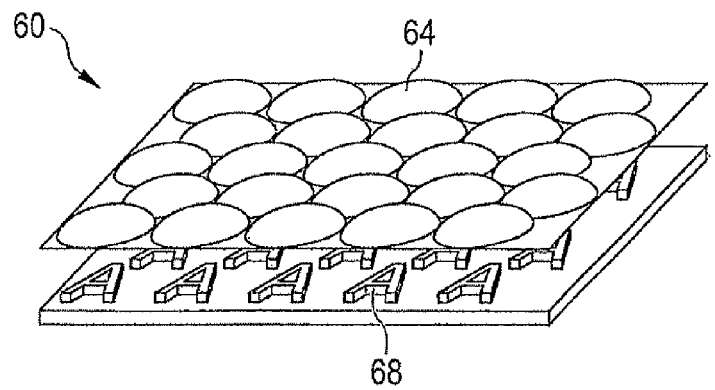
Figure 3B:
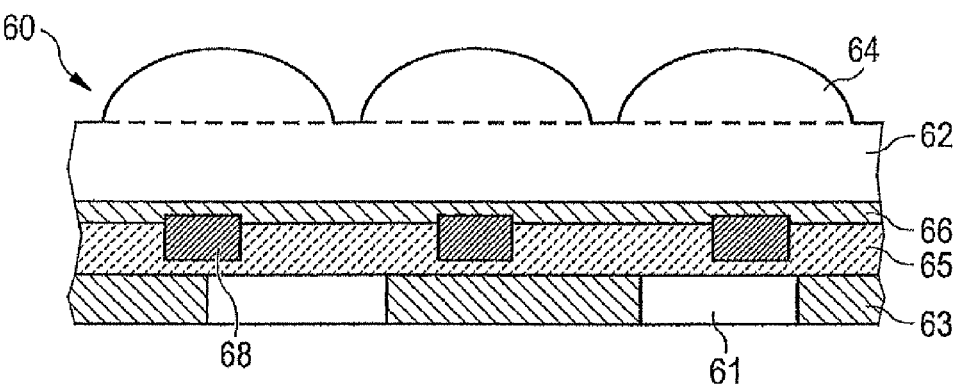

FIG. 3 shows an inventive security element with a monochrome motif image, the security element being configured as a cover foil 60 for a bank note with a hole. FIG. 3(a) shows a strongly schematized perspective view from obliquely above, FIG. 3(b) a cross section through the security element.

The security element 60 has a transparent carrier 62, an arrangement of microlenses 64, a support layer 66 and colored microstructure elements (micromotif elements) 68. In FIG. 3(a) the micromotif elements 68 are shown for simplifying the representation only as the simple letter "A". Alternatively, the micromotif elements can also be present in the form of complicated logos or images which require a very high resolution. In this case not only the lenses 64 are produced from inventive embossing lacquer, but preferably also the micromotif elements 68, whereby the embossing lacquer for the micromotif elements 68 is colored with nanopigments or reactive dyes according to the invention.

In the shown embodiment the micromotif elements 68 are embedded in an overlacquering 65 and thus protected against forgery attacks.

As mentioned above, it is basically also conceivable to provide, additionally or alternatively to the overlacquering of the second micro-optic arrangement (micro-structures), the first micro-optic arrangement (focusing elements) also with an overlacquering. Advantageously, this also causes the focusing elements, in the case of the embodiment shown in FIG. 3 the microlenses 64, to be reliably protected against forgery attacks. However, for clarity's sake the present application does not include any figures showing the overlacquering of a first micro-optic arrangement.

If desired, additional functional layers can be applied, for example a metallic or color-shifting coating 63 shown by a dashed line in FIG. 3(b), which contains negative image elements in the form of uncoated partial areas 61. Such coatings with gaps can be readily produced with a washing method as known for example from the print WO 99/13157 A1 or the unpublished German patent application with the application number 10 2007 001 791.1. With regard to the method for producing the partial areas 61, the disclosure of WO 99/13157

A1 and DE 10 2007 001 791.1 is incorporated into the disclosure of the present application.

Figure 4A:
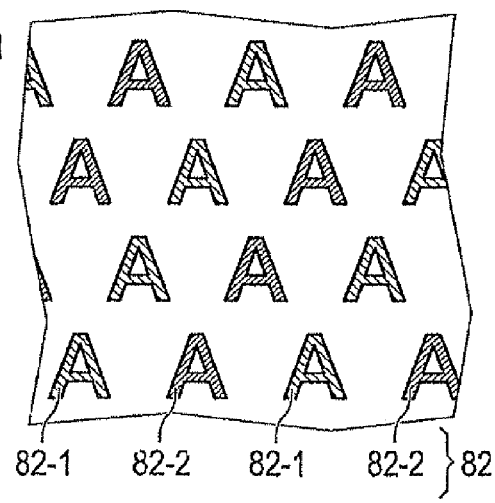
Figure 4B:
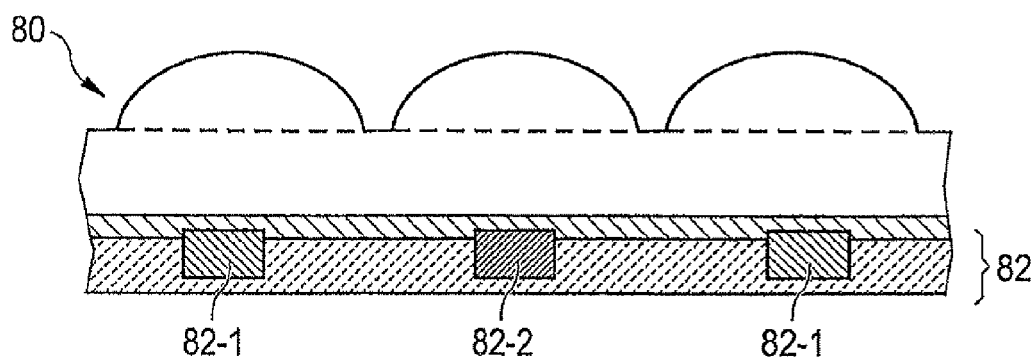

The security element 80 shown in FIG. 4 according to a further exemplary embodiment of the invention has a polychrome motif image. The arrangement of the microstructure elements 82 shown in plan view in FIG. 4(a) contains different-colored microstructure elements 82-1 and 82-2, which are again shown in the figure only by the letter "A" for simplifying the representation. The microstructure elements can also be complex representations, however, which require a fine resolution which is guaranteed by the inventively colored embossing lacquer with nanopigments or reactive dyes. FIG. 4(b) shows a cross section through the security element.

Figure 5A:
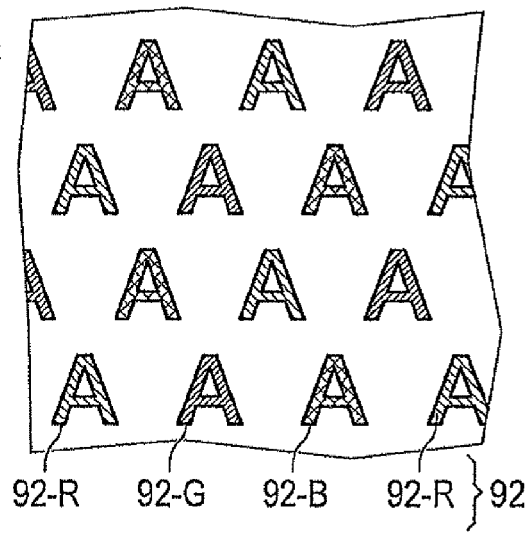
Figure 5B:
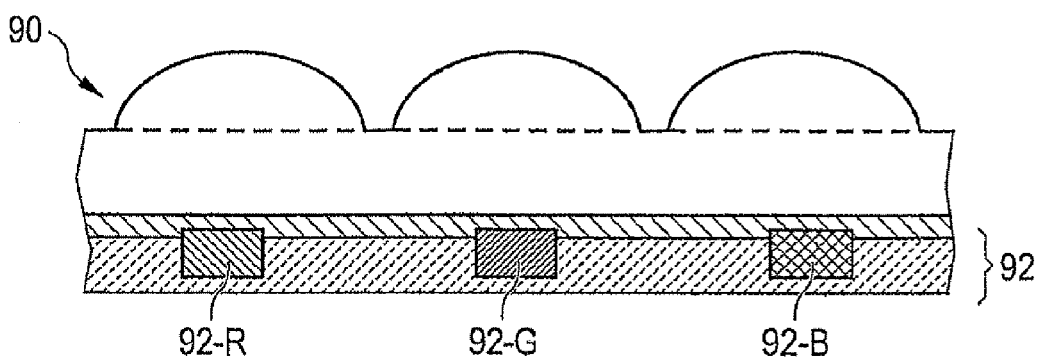

FIG. 5 shows a further design of an inventive security element 90 which has a microstructure with mixed colors. In the shown exemplary embodiment, neighboring microstructure elements 92-R, 92-G, 92-B are applied respectively with red, green and blue inventive embossing lacquer with certain structure depths and line widths. On account of the small dimensions of the microstructure elements 92 of for example about 35 μm or less, the individual colors cannot be resolved upon viewing and the viewer perceives a mixed color. When different mixed colors are produced in different areas of the security element it is possible to produce moire magnification arrangements with color gradations, color shift effects or color contrast variations.

Color shift effects can alternatively also be produced when the microstructures 92 are provided with a vapor-deposited thin film structure. Instead of a thin film structure there can also be provided color-shifting special-effect inks in certain areas.

By a suitable arrangement of the microstructure elements 92-R, 92-G, 92-B there can also be achieved a continuous color gradation from red to green.

Figure 6A:
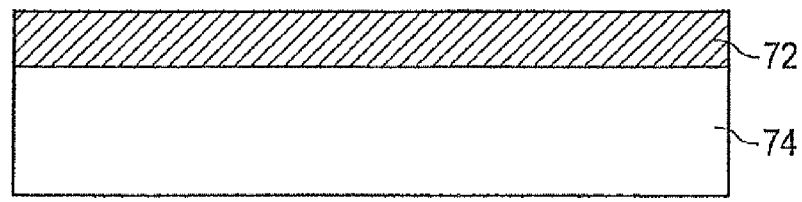
Figure 6B:
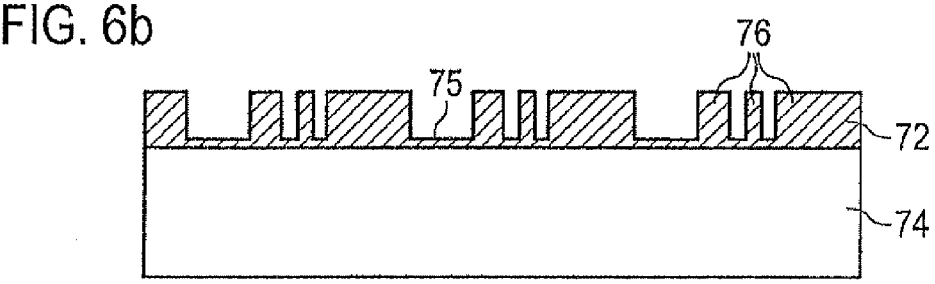

FIGS. 6(a) and 6(b) show an inventive security element in the production phase, whereby the microstructuring of the highly refractive embossing lacquer is not produced by microgravure printing as in the previous embodiments, but by conventional printing and embossing techniques. Hence, there is no support layer between the transparent carrier substrate 74 and the layer consisting of highly refractive embossing lacquer 72. The highly refractive embossing lacquer is colored according to the invention with nanopigments or reactive dyes. The production is effected by first applying the colored embossing lacquer 72 to a transparent carrier substrate 74 by conventional printing methods. Then the microstructuring of the embossing lacquer is effected by known embossing techniques. The embossing lacquer layer 72 is thereby structured into thin, i.e. nearly colorless, areas 75 and thicker areas 76 forming microstructures, resulting in a colored microimage or a microstructure arrangement of high resolution (FIG. 6(b).

The arrangement shown in FIG. 6 comprising carrier foil 74 and microstructures 76 is then combined with an arrangement of focusing elements, which according to the invention are likewise produced from the highly refractive embossing lacquer, into a micro-optic security element.

Figure 7:
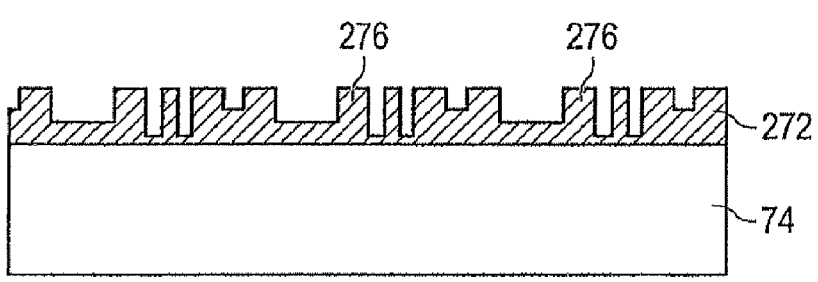

FIG. 7 shows a microstructure arrangement similar to that of FIG. 6, but the embossed lacquer layer 272 so configured that the microstructures 276 of the microstructure arrangement are configured with different profile heights or depths which achieve a different color saturation and thus a different contrast according to the particular thickness of the inventive embossing lacquer layer. In this manner it is possible to realize microstructures also as halftone images for example.

Figure 8:
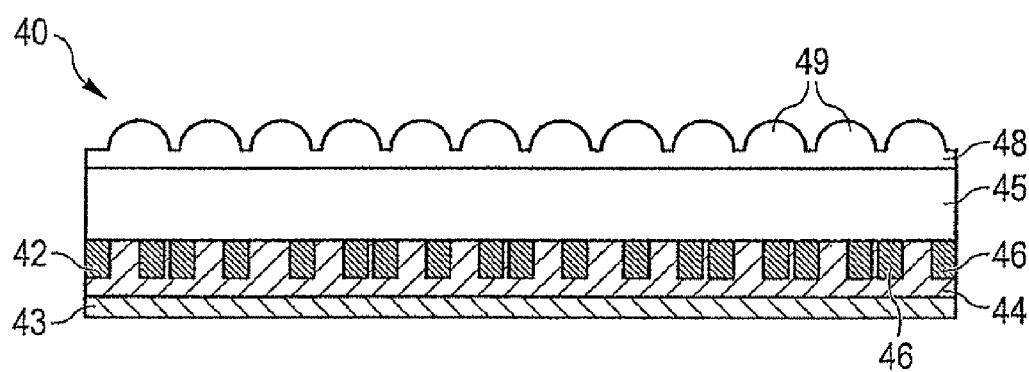

A further way of producing embossed microstructures is explained more closely in FIG. 8. In this exemplary embodiment the embossing is carried out in a transparently colored embossing lacquer 42, e.g. transparently colored UV lacquer, which is applied to a transparent carrier substrate 45, e.g. a PET foil. The embossed microstructures 46 can subsequently be present e.g. in the form of characters or patterns, i.e., microcharacters or micropatterns. On the other side of the carrier substrate 45 a lens arrangement 48 having a multiplicity of microlenses 49 is embossed in an inventive radiation-curing embossing lacquer, e.g. a UV lacquer.

Under the embossing lacquer layer 42 there is applied a reflective metal layer or an opaque, e.g. white, ink layer 44. Upon use of differently colored embossing lacquers and covering colors it is possible to produce in this manner in particular subtractive and additive color effects.

For transferring the security element 40 to a security paper or for improving the adhesion of a security element designed as a security thread, an activatable adhesive 43 can further be applied to the metal or ink layer 44.

According to the invention, the security elements with micro-optic authenticity features are employed for securing the authenticity of any desired products. In product packages, for example, the micro-optic authenticity features can be contained in a tear thread.

Another subject of the present invention is an object of value, such as a branded article, a value document, a bank note or the like, which is provided with an inventive security element.

The invention claimed is:

1. A security element for marking the authenticity of objects of value, said security element comprising:
    a substrate and at least one micro-optic authenticity feature provided on said substrate, the micro-optic authenticity feature comprising a first micro-optic arrangement with a multiplicity of focusing elements which are present in a first grid, and a second micro-optic arrangement with a multiplicity of microstructures which are present in a second grid,
    the first and second arrangements being disposed such that the microstructures of the second arrangement are observable as magnified upon viewing through the focusing elements of the first arrangement,
    wherein the first and/or second micro-optic arrangements comprise a polymeric material and are produced from a highly refractive embossing lacquer which contains at least one binding agent which has at least one radiation-curing compound comprising one or more organic compounds, at least a portion of said organic compounds of the radiation-curing compound comprising molecules with at least one polarizable element, so that the radiation-curing compound is configured to form a polymeric material with a refractive index of greater than 1.5 upon radiation curing of the radiation-curing compound.

2. The security element according to claim 1, wherein the polarizable element comprises at least one element which is selected from the group consisting of S, Cl, Br, I and mixtures thereof.

3. The security element according to claim 1, wherein the radiation-curing compound comprises a UV-curing compound.

4. The security element according to claim 1, wherein the embossing lacquer contains a polymerization initiator.

5. The security element according to claim 1, wherein the radiation-curing compound comprises a compound curable by electron beams.

6. The security element according to claim 1, wherein the radiation-curing compound is polyreactable radically or cationically.

7. The security element according to claim 1, wherein the compounds of the radiation-curing compound are used as monomers and/or prepolymers.

8. The security element according to claim 1, wherein a polymeric material with a refractive index of greater than 1.6, preferably greater than 1.7, is formed upon said curing.

9. The security element according to claim 1, wherein the compounds of the radiation-curing compound are self-crosslinking compounds.

10. The security element according to claim 9, wherein the self-crosslinking compounds of the radiation-curing compound comprise molecules of the same or a different chemical identity.

11. The security element according to claim 9, wherein self-crosslinking compounds of the radiation curing compound comprise at least one acrylate.

12. The security element according to claim 9, wherein self-crosslinking compounds of the radiation curing compound comprise at least one epoxide.

13. The security element according to claim 9, wherein self-crosslinking compounds of the radiation curing compound comprise at least one episulfide.

14. The security element according to claim 1, wherein the radiation-curing compound comprises a first compound and a second compound which can be reacted with the first compound so as to crosslink.

15. The security element according to claim 14, wherein the first compound of the radiation-curing compound and/or the second compound of the radiation-curing compound comprise molecules of the same chemical identity or a different chemical identity.

16. The security element according to claim 14, wherein the second compound comprises a thiol and/or a polythiol.

17. The security element according to claim 14, wherein the first compound comprises an isocyanate.

18. The security element according to claim 14, wherein the first compound is or contains an olefinically unsaturated compound.

19. The security element according to claim 14, wherein the first compound comprises an epoxide.

20. The security element according to claim 14, wherein the first compound comprises an episulfide.

21. The security element according to claim 1, wherein all compounds of the radiation-curing compound comprise molecules with at least one polarizable element.

22. The security element according to claim 1, wherein at least a portion of the compounds of the radiation-curing compound comprise molecules with at least two polarizable elements.

23. The security element according to claim 1, wherein the embossing lacquer contains nanoparticles, wherein said nanoparticles have a high refractive index.

24. The security element according to claim 23, wherein the nanoparticles are nanopigments.

25. The security element according to claim 23, wherein the nanoparticles are polymerized into the embossing lacquer when the radiation-curing compound is radiation cured.

26. The security element according to claim 1, wherein the embossing lacquer contains reactive dyes.

27. The security element according to claim 1, wherein the embossing lacquer further comprises at least one of the following: additives for viscosity control, additives for flow control or release, waxes, defoamers, thinners, reactive thinners, photoinitiator, or coloring.

28. The security element according to claim 1, including at least one further authenticity feature which is checkable by machine and/or visually.

29. The security element according to claim 1, wherein the first and second grids of the micro-optic authenticity feature have a fixed geometrical relation on the substrate such that the microstructures of the second arrangement are magnified by the focusing elements of the first arrangement.

30. The security element according to claim 1, wherein the microstructures of the second arrangement of the micro-optic authenticity feature are present in the form of microcharacters or micropatterns.

31. The security element according to claim 1, wherein the microstructures and/or the focusing elements are configured to be colored.

32. The security element according to claim 31, wherein the microstructures comprise microstructure elements of different color.

33. The security element according to claim 1, wherein the security element has a total thickness of 20 to 50 µm.

34. The security element according to claim 1, wherein the security element is configured as a transfer element or a security thread.

35. A method for producing a security element according to claim 1, wherein the microstructures and/or the focusing elements are applied by techniques of semiconductor technology, or by micro-contact printing (µCP) or microgravure printing.

36. Use of a security element according to claim 1 for marking the authenticity of a product.

37. A data carrier, such as a value document, comprising a security element according to claim 1.

* * * * *